Jan. 6, 1925.
C. SCRABIC
MOTOR BOARD MOUNTING
Filed April 3, 1922
1,521,909
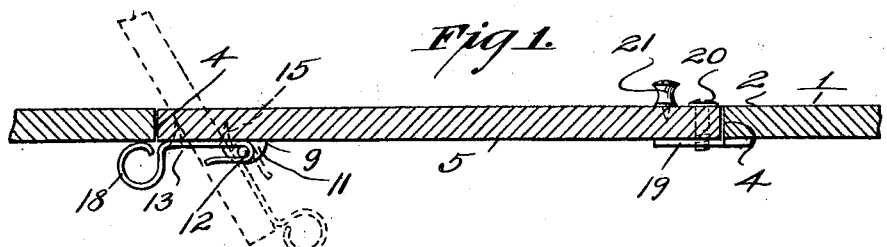
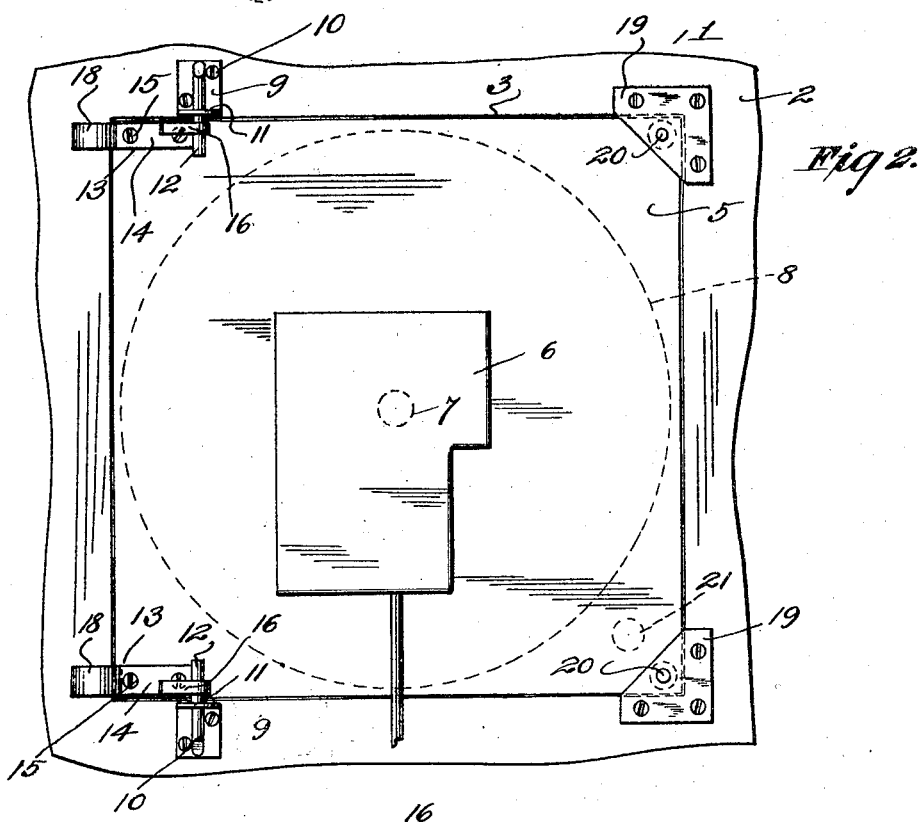
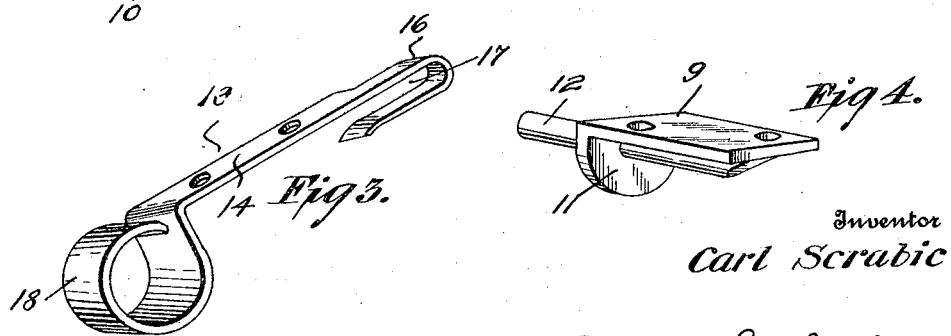
Inventor
Carl Scrabic

Patented Jan. 6, 1925.

1,521,909

UNITED STATES PATENT OFFICE.

CARL SCRABIC, OF URBANA, OHIO.

MOTOR-BOARD MOUNTING.

Application filed April 3, 1922. Serial No. 548,980.

*To all whom it may concern:*

Be it known that CARL SCRABIC, a citizen of the United States, residing at Urbana, in the county of Champaign and State of Ohio, has invented certain new and useful Improvements in Motor-Board Mountings, of which the following is a specification.

This invention relates broadly to improvements in talking machines, and has particular reference to an improved motor board construction for such machines, the primary object thereof being to provide a motor board capable of tilting relatively to the top of the machine in order that the motor associated therewith will be rendered conveniently accessible for lubricating, repair and other purposes.

An object of the invention rests in the provision of an improved mounting for a motor board which will enable the latter to be readily and securely clamped in its lowered position by the agency of but a minimum of fastening elements, which may be conveniently removed to admit of swinging movement on the part of the board; the corners of the board, opposite the said screws, being provided with an improved resilient hinge mounting, which will be under tension when the board assumes its lowered position, for the purpose of maintaining the said board rigid and free from undue vibration.

Another object of the invention resides in forming the hinge mountings for the motor board so that the latter will possess a balance which will enable the same to be conveniently tilted and maintained in its elevated or raised positions.

For a further understanding of the invention, reference is to be had to the following description and to the accompanying drawing, wherein similar characters of reference denote like and corresponding parts throughout the several views thereof.

In said drawing:

Figure 1 is a vertical sectional view taken through the upper portion of the cabinet of a talking machine and illustrating the improved motor board construction comprising the present invention, the said board having its elevated position disclosed by dotted lines, Figure 2 is a bottom plan view of the board setting forth more particularly the means for pivotally mounting the same, Figure 3 is a perspective view of the spring hinge, and Figure 4 is a view of the base plate for the hinge.

Referring more particularly to the details of the invention, the numeral 1 designates the cabinet of a talking machine, and the numeral 2 the upper or top wall thereof. This wall is provided with a rectangular opening 3, bounded by vertical walls 4, and arranged to be positioned within the opening 3 is a motor board 5, which is of the general shape and size of the opening 3. This motor board, as usual, carries the spring or other motor 6 of a talking machine, and the center of said board is apertured to receive the turn table shaft 7 of the motor, the upper end of the shaft is arranged to project through the board 5 for the reception of a rotatable record support or turn table 8.

It will be understood that it is necessary from time to time to inspect the motor 6 for the purpose of lubricating the same or to make repairs, therefore a motor board 5 is provided which is capable of being raised so that the motor 6 carried in depending relation therefrom will be rendered accessible for any desired purpose. The present invention aims to provide an improved mounting for the board 5 which will maintain the same secure and rigid within the opening 3 by the use of few and simply constructed parts, which are of such form as to effectually overcome vibration on the part of said board and yet will require the use of but two main fastening elements to control the positions of the board.

To this end, the board is pivotally mounted by means of an improved hinge construction, comprising the present invention, contiguous to its rear corners, and this is accomplished by providing the upper wall 2 of the cabinet, adjacent the opening 3, with fixed base plates 9 directly secured to the wall 2 by means of screws or the like 10. The plates 9 include downwardly projecting ears 11, and longitudinally projecting studs 12 which, in conjunction with the ears 11, are in this instance integrally formed with the plates 9, the said studs projecting laterally beneath the board 5. The latter in this form of the invention, adjacent to the plates 9, is formed to carry a pair of spring hinges 13. As shown, these hinges consists of metallic straps, formed to include longitudinally extending body portions 14 which are directly secured, by the use of screws 15 to the under surface of the board 5 adjacent to its rear corners. The body portions 14 terminate forwardly in hook shaped extremities 16, wherein slots 17 of an elongated character are provided for the purpose of receiving the trunnion studs 12 of the base plates. By this construction it will be observed that when in an elevated position the motor board, with its associated structure will be directly supported by the studs 12 and will be capable of oscillating on a vertical plane in a hinge like manner. The slots 16 are provided to enable the vertical side edges of the motor board to clear the corresponding vertical edges 4 of the upper wall 2 when the said motor board is being swung to assume open or closed positions.

The rear ends of the hinges 13 are in this instance formed to produce curved resilient substantially circular extremities 18, which are so located that when the board occupies its closed or lowered position the extremities 18 will engage with the under surface of the wall 2 as shown in Figure 1. The engagement between the extremities 18 and the under surface of the wall 2 takes place immediately prior to the full closing movement of the motor board and therefore it follows that when the board is finally forced against the resistance of the extremities 18, into its fully closed or lowered position, the hinges 12 will be placed under considerable tension, which is sufficient, if unobstructed, to partially elevate and maintain elevated the motor board 5. After the board has been fully forced down into engagement with fixed cleats 19, carried by the under surface of the wall 2, contiguous to the forward corners of the board 5, the said board is retained in its closed position by means of the screws 20, which have their inner ends threaded into openings provided in the cleats 19. Thus, it will be apparent that through the medium of the two screws 20 the board will be retained in its lowered position in a secure and solid manner, wherein vibration on the part thereof will be effectively precluded, so that the same will constitute a solid base for the motor 6 and the associated turn table. If desired, a knob 21 may be provided upon the upper surface of the motor board to facilitate raising and lowering thereof. By the position of the studs 12, the board may be readily swung to assume its open position and by resting against the rear of the walls 4 the said board may be maintained in its elevated position unsupported, thus enabling an operator to employ both hands in repairing the motor. By the construction described it will be apparent that the present invention provides a simple mounting for a motor board which will be inexpensive, efficient and capable of being readily operated with but a minimum of difficulty and expenditure of time, and that by the provision of the spring hinges a secure and stationary mounting for the board will be provided when the latter occupies its lowered position.

What is claimed is:

1. In a device of the class described, the combination with a fixed member having studs carried thereby, of a movable member having hinged sections carried thereby for slidably and pivotally engaging the studs, and means carried by the hinge sections for yieldably engaging the fixed member, as and for the purpose set forth.

2. In combination with a top wall of a talking machine cabinet having an opening therein, of a motor supporting board located in the opening, studs carried by the top wall, hinge sections secured intermediate their ends to the motor supporting board and having their respective ends terminating in resilient extremities and hooks, said hooks being adapted to slidably and pivotally engage the studs, and the resilient extensions being adapted to engage said top board, as and for the purpose set forth.

In testimony whereof I affix my signature.

CARL SCRABIC.